United States Patent [19]

Romans

[11] 4,158,402
[45] Jun. 19, 1979

[54] MOTORCYCLE CHAINGUARD AND LUBRICATOR

[76] Inventor: Orville Romans, Logansport Rd., Morgantown, Ky. 42258

[21] Appl. No.: 840,539

[22] Filed: Oct. 11, 1977

[51] Int. Cl.² .............................................. F16P 1/00
[52] U.S. Cl. ..................................... 184/15 R; 74/611
[58] Field of Search ........................ 74/611; 184/15 R

[56] References Cited

U.S. PATENT DOCUMENTS

| | | | |
|---|---|---|---|
| 501,626 | 7/1893 | Percy | 74/611 |
| 583,144 | 5/1897 | Farmer | 74/611 |
| 592,288 | 10/1897 | Holmes | 74/611 |
| 596,616 | 1/1898 | Pierce | 74/611 |
| 601,733 | 4/1898 | Phillips | 74/611 |
| 607,786 | 7/1898 | Whitney | 74/611 |
| 3,144,916 | 8/1964 | Lien | 184/15 R X |
| 3,459,156 | 8/1969 | Harter | 184/15 R |
| 3,939,730 | 2/1976 | DeHaan | 184/15 R X |

FOREIGN PATENT DOCUMENTS

| | | | |
|---|---|---|---|
| 958995 | 3/1950 | France | 74/611 |
| 79515 | 2/1934 | Sweden | 74/611 |
| 924 of | 1893 | United Kingdom | 74/611 |
| 17251 of | 1899 | United Kingdom | 74/611 |
| 523701 | 7/1940 | United Kingdom | 74/611 |

*Primary Examiner*—David H. Brown
*Attorney, Agent, or Firm*—Nathan J. Cornfeld

[57] ABSTRACT

A lubricating chainguard for motorcycles and similar vehicles is disclosed wherein a front or transmission-sprocket housing and a spaced rear or driven-sprocket housing are interconnected by a rigid hose or pipe assembly to form a completely enclosed guard through which a chain can pass freely while being immersed, at least in part, in an enclosed body of lubricating oil or grease thereby to maintain the said chain in continuously lubricated condition during operation of the motorcycle.

1 Claim, 5 Drawing Figures

MOTORCYCLE CHAINGUARD AND LUBRICATOR

BACKGROUND

The present invention relates to drive systems for motorcycles and similar vehicles, and more particularly to completely enclosed guards for such systems capable of providing continuous lubrication of the chain drive of the system during operation of the vehicle.

Enclosing structures for drive-sprocket, driven-sprocket and associated chain drives for motorcycles, such structures containing oil supplies through which the chain passes during operation of the motorcycles are disclosed in U.S. Pat. No. 3,939,730 to De Haan, patented Feb. 24, 1976; British Pat. No. 523,701, to Marchant, of July 19, 1940; and French Pat. to Oesch, No. 958,995, of March 20, 1950.

The prior art, as depicted in the cited disclosures apparently appreciate the many advantages flowing from substantially encasing the drive chain and sprockets in a housing and providing oil lubrication, thereby to prolong the useful life of the chain, to minimize evaporation of the lubricant, to minimize the harmful effects of water, sand and other contaminants, to provide a measure of protection of the engine casing, the rider, and his clothing, either prior to or subsequent to the accidental breaking of the chain in operation. All of these represent hazards of varying degree under conditions where chainguards are either completely omitted, or, if provided, are not substantially complete closures for the chain-drive system.

The present invention provides the aforesaid advantages of the prior art devices inasmuch as there is provided a complete guard casing for the driving and driven sprockets and the interconnecting pipe assembly enclosing, in a preferred form, a quantity of lubricating grease through which the chain passes in operation.

However, whereas the prior art discloses flexible or other relatively movable coupling means between the front portion of the chainguard and the rear portion thereof, in accordance with my invention, the complete chainguard is relatively rigid and inflexible so that travel of the motorcycle so equipped over rough roads cannot produce or create displacement of one portion, say the rear portion, of the guard relative to the front portion. Instead, by this invention, any up and down movement of the rear wheel of the motorcycle caused by travel over rough road or terrain is accompanied by arcuate displacement of the entire guard about the front or transmission sprocket axle, the entire guard being relatively rigid and inflexible. Similarly, up and down movement of the front wheel causes arcuate displacement of the inflexible guard to be displaced arcuately, as a unit, about the rear or driven sprocket axle.

By these means, the flexible coupling sleeves, of the prior art, usually of rubber or the like, are eliminated and the consequent risk of fracture at such coupling that can occur when the rubber or similar materials become hardened and brittle through continuous vibration and exposure to the elements, rain, sleet, ice, snow and heat, is eliminated.

Another feature of the present invention resides in the ease of access to the interior of the guard assembly whereby to facilitate connecting the respective ends of the drive chain. According to this invention, one of the interconnecting pipes is constructed to be slideably adjustable over projecting integral pipe portions of the driving sprocket housing, thus exposing the interior of the guard for threading the chain over the sprockets and fastening the ends of the chain together. O-ring seals are provided at the ends of the integral pipe portions of both the driving and driven sprocket housings to effectuate grease-tight seals, as will appear.

A principal object of the invention is to provide a lubricating chainguard for a motorcycle which obviates the need for flexible coupling between any and all portions of said chainguard.

Another object of the invention is to provide such a chainguard in which easy access to the interior of the guard is readily available by selective sliding movement of an interconnecting portion joining a front or driving-sprocket casing and a rear or driven-sprocket casing.

Another object of the invention is to provide a lubricating chainguard for a motorcycle or similar vehicle which is simple in design, inexpensive to manufacture and maintain, rugged in construction, easy to assemble and efficient in operation.

These and other objects will be apparent upon study of the following descriptions taken in connection with the accompanying drawing.

DESCRIPTION OF THE INVENTION

Figure 1:
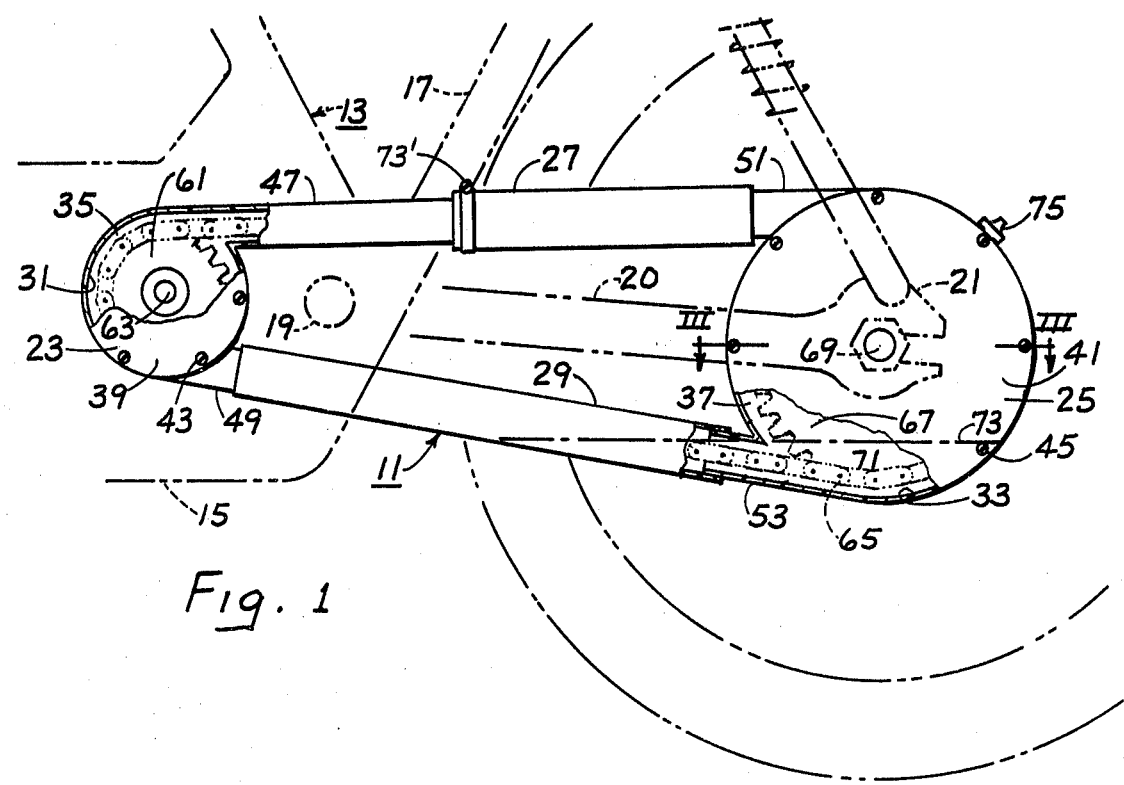
FIG. 1 is a side elevational view with parts in cross section, of the present invention with a portion of a motorcycle shown in phantom.

The chainguard of this invention, here designated generally by the reference numeral 11, is illustrated as applied to a motorcycle 13, generally depicted in phantom by dot-dash lines, and which, for convenience, is symbolically shown to comprise a conventional housing 15, enclosing, among other elements, a gasoline engine, starter, transmission, ignition system, all as well-known to those skilled in the art of motorcycle vehicles. For reasons which will appear, the motorcycle can be a well-known HONDA-750 Series, although the chainguard of this invention is not limited to use with such motorcycles.

Also shown in FIG. 1, in phantom, is a portion of the motorcycle frame 17 and the pivot pin 19 about which the rear and front portions of the frame of the motorcycle can pivot when the vehicle is traveling over terrain such that the rear portion rises and falls with respect to the front portion of the vehicle.

Additional parts of the motorcycle frame are shown in phantom as at 20 and 21, the numeral 20 designating generally a rear fork arm, while the numeral 21 designates generally a bifurcated rear fork portion. Inasmuch as the motorcycle structural elements, per se, and independently of the chainguard and adapter element to be described hereinafter, form no part of my invention, a more complete description of such structural elements is thought to be unnecessary. For a complete description of such structural elements, reference may be made, for example, to the book published by Clymer Publications, Los Angeles, California, entitled "HONDA, SERVICE-REPAIR HANDBOOK", edited by Eric Jorgensen, 6th Edition, 1977.

As shown in FIG. 1, the chainguard 11 is a four part substantially complete enclosure including a front housing 23, a rear housing 25, an upper connecting pipe 27, and a lower connecting pipe 29.

The front and rear housings, 23 and 25, are separately formed, preferably by rotational molding of high-density polyethylene resin, one such resin which has yielded very satisfactory product is sold in pellet or mesh form under the name CHEMPLEX 5080, by COMPLEX COMPANY, Rolling Meadows, Illinois. The finished housings are formed with generally cylindrical wall portions 31, for housing 23 and 33 for housing 25. One planar wall 35 of housing 23 is molded integrally with the cylindrical wall portion 31 and one planar wall 37 is molded integrally with housing 25. The planar walls 35, 37 are each centrally apertured to receive front and rear axle assemblies as will appear below. Detachable planar covers 39 and 41 are provided for housings 23 and 25, respectively, which covers can be sealingly secured to enclose the space defined by the respective cylindrical housing by means of fasteners, 43 and 45. A satisfactory type of fastener for the polyethylene plastic enclosures just described is the so-called "Hi-Lo" fastener, which is quite shake-or vibration proof, manufactured by the SHAKEPROOF DIVISION OF ILLINOIS TOOL WORKS, INC., Elgin, Illinois.

The molded polyethylene front housing 23 is formed with a pair of tangentially extending hollow pipe projections, a relatively long upper projection 47 and a relatively short lower projection 49. The projections 47 and 49 communicate with the interior of the housing 23 and are of each of outer diameter sufficient to be tightly received telescopically within the adjacent end of respective connecting pipes, projection 47 in pipe 27 and projection 49 in pipe 29.

The molded polyethylene rear housing 25 is formed with a pair of tangentially extending hollow pipe projections of substantially equal length, the upper projection being designated 51 and the lower projection being designed 53. The projections 51 and 53 communicate with the interior of the housing 25 and are also of outer diameter sufficient to be tightly received within the adjacent ends of respective connecting pipes, projection 51 in upper pipe 27 and projection 53 in lower pipe 29. To ensure oil- or grease-tight connections at the four telescopic junnctions, e.g. projections 47 and 49 and the respective left-hand ends of pipes 27 and 29 and projections 51 and 53 and the respective right-hand ends of pipes 27 and 29, I provide O-ring seals at each of the four junctions, one such seal being shown in the fragmentary detail view of FIG. 2. Inasmuch as the other three junction seals are of identical construction, only the seal at the junction of projection 53 and pipe 29 is described.

Figure 2:
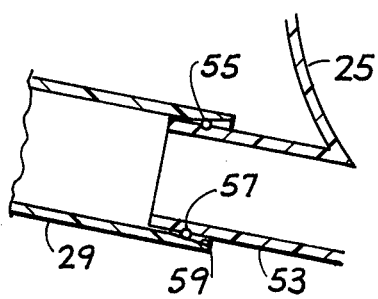
FIG. 2 is a fragmentary view of a part of FIG. 1, drawn to an enlarged scale.

As shown in FIG. 2, a rubber or other suitable material O-ring 55 is seated in a groove 57 formed adjacent the free end of projection 53. The end of pipe 29 is internally tapered as at 59 so that sliding movement of pipe 29 over projection 53 causes deformation of the part of the O-ring that protrudes above the groove, thereby forming an oil-tight or grease-tight seal at the junction. Similar O-ring seals are provided at the other junctions; projection 47, pipe 27; projection 49, pipe 29; and projection 51, pipe 27.

There has thus been described a four-part interconnected enclosure in the front housing 23 of which a driving sprocket 61 is rotatably mounted on the front axle 63 by the engine and transmission in housing 15. Drive chain 65 passes over the teeth of sprocket 61 and through projection 47, upper pipe 27, projection 51 to mesh with teeth of driven rear sprocket 67 that is rotatably mounted on rear axle 69. The chain 65 is endless and thus passes out through projection 53, lower pipe 29, projection 49 to complete the circuit at driving sprocket 61. As shown, the sprockets 61 and 67 and chain 65 move freely within the guard, the chain 65 during its movement passing through a supply of good grade chain grease or lubricant that is desirably maintained at a level indicated by the line 73. A fitting 75 is provided in the cylindrical wall portion 33 of housing 25 whereby the grease may be introduced by means of a grease gun (not shown).

To gain access to the interior of the chainguard enclosure for assembly of the drive chain 65 or to inspect the level of lubricant, or to inspect the condition of the chain, or for any other reason, it can be accomplished simply by sliding upper connecting pipe 27 over the exposed part of projection 47. To ensure against unwanted sliding movement of this nature, it may be desirable, should the O-rings have become permanently deformed, to provide a clamp 73' which can be tightened to prevent such unwanted slippage. I have found such clamps to be unnecessary on lower connecting pipe because this pipe is commonly not disturbed from its initial position for any reason.

Figure 3:
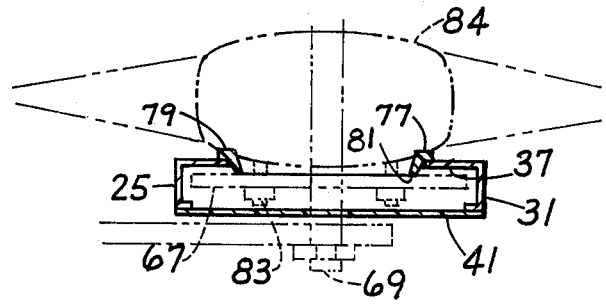
FIG. 3 is a cross-sectional view taken along the line III—III of FIG. 1.
Figure 4:
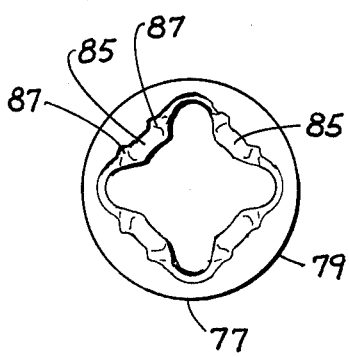
FIG. 4 is a fragmentary detail of an adapter element according to the invention illustrating one face of the adapter.
Figure 5:
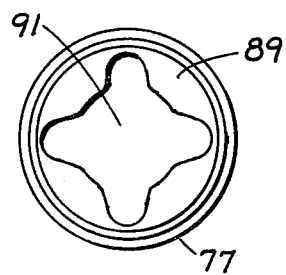
FIG. 5 is a fragmentary detail of the element of FIG. 4 depicting the reverse face.

FIGS. 3, 4 and 5 illustrate an adapter element of this invention which enables the chainguard II to be fitted and attached effectively to the 750 Series HONDA motorcycle. The adapter, here shown at 77 is a molded polyethylene generally of circular cross-section having a relatively wide-diameter flange portion 79, the under surface of which bears against the outer surface of the integral planar wall 37 of rear housing 25 in a smooth, extremely low-friction contacting arrangement. A relatively small-diameter portion 81 of the adapter is received in the aperture formed in the planar wall 37 of housing 25 and is provided with four openings through which bolts 83 that fasten driven sprocket 67 to the rear hub 84, here shown in phantom, inasmuch as the hub structure, per se, forms no part of my invention, may be passed. The bolts 83 after passing through the adapter and the driven sprocket 67 are secured as by nuts.

As seen in greater detail in FIG. 4, the surface of adapter 77 in contact with the hub 84 is molded to provide a symmetrical pattern of cusps 85 and ridges 87 exactly conforming with elevated and depressed areas characteristic of the adjacent surface of the hub 84. In this manner, the mating surfaces of the adapter and the hub are nested one with the other so that the adapter is free to rotate with the driven sprocket and hub relative to the chainguard rear housing 25 in a smooth, substantially low-drag, manner.

As seen in FIG. 5, the abutting surfaces of the adapter 77 and the adjacent surface of driven sprocket 67 is a tight smooth contacting arrangement inasmuch as the contacting surface 89 of adapter 77 is planar. The opening 91 through that surface 89, of course, corresponds to the inner contour of the above-described surface that mates with the hub 84.

To install the chainguard, the drive chain 65 is disconnected at the master link and the driving sprocket 61, the driven sprocket 67 and rear wheel fork are preliminarily removed. The front housing 23 is positioned over the transmission shaft. Thereafter the rear wheel fork is replaced. The driven sprocket 67 is removed from the rear hub and the adapter 77 is positioned in contact with the rear hub with the surface shown in FIG. 4 nesting with the mating surface of the hub. Firm pressure is applied between the adapter and the hub and then the rear housing 25 is positioned over the adapter and hub. The driven sprocket 67 can now be installed inside the rear housing 25.

The driven chain 65 is fed through the opening of the lower projection 53 of housing 25 until the chain contacts the teeth of the driven sprocket 67, whereupon the sprocket is rotated until several inches of chain appears out of the opening of the upper projection 51 of housing 25. A suitable plastic sealer is then applied to the detached cover 41 around the peripheral portion thereof that will be sealed to the cylindrical wall portion of housing 25. The cover 41 is placed in position and secured by fasteners 45.

Next, the free end of the chain is hand-fed through the lower connecting pipe 29, the latter then being connected to the lower projection 53 of housing 25 by sliding the projection 53 into the opening of pipe 29 as far as possible. The upper connecting pipe is now slid telescopically over the long projection 47 of front housing 23, sliding it over as far as possible.

Now, position the driving sprocket 61 in the front housing and tighten it onto the shaft in the usual manner. If the Honda is equipped with external chain oilers, this should be turned to "off position".

With the transmission in neutral and the rear wheel in an appropriate position, the drive chain is fed through the lower projection 49 of housing 23, around the driving sprocket 61 and out the upper projection 47. A short piece of wire may assist with the threading of the chain. As the chain is fed through the front housing 23, the rear wheel can be maneuvered into its original position. The front and rear housings can now be interconnected by the lower connecting pipe, whereupon the chain assumes its proper position and is now ready to be connected. The upper connecting pipe can now be slid back into its position to completely enclose the guard by sliding it over the adjacent end of upper projection 51 of rear housing 25. Finally, if provided, clamp 73 is tightened and a suitable chain grease is applied through fitting 75. Or, if no fitting is provided, the lubricant can be added through the front housing 23 before the cover 39 has been installed.

Certain advantages of the chainguard herein disclosed, in the light of the foregoing description, will now be apparent. Because the polyethylene plastic of which the guard is constructed, which plastic can be regarded as virtually indestructible, destructive testing has shown that parts made of such material having successfully withstood repeated blows with a 10 pound maul and 1800 foot-pounds impacts by a 300 pound boulder. It thus appears that accidental breakage of the drive chain, even at high speed, would fail to fracture the housings or the connecting pipes.

Moreover, as is well-known, only limited space is provided on a motorcycle for ignition and other electrical wiring with the result that such wiring is commonly disposed in very close adjacent relation to drive chainguards. With such guards made of steel or other electrically conductive materials, the danger of short circuit is always present. The plastic guard of this invention minimizes this risk.

As previously observed the elimination of rubber hoses to interconnect parts of the connecting pipes minimizes the risk of destruction of such rubber hoses and at the same time provides a pivot point for arcuate movement of the rear wheel relative to the front wheel which avoids any wear points between the transmission and rear axles.

The provision of ready access to the interior of the guard by the simple expedient of telescopically sliding the upper connecting pipe over the long projection of front housing facilitates assembly of the drive chain and permits inspection of the chain in but one simple operation.

While there has thus been described a preferred embodiment of the invention, it will be understood that it is by way of illustration only and that various modifications will be apparent to those skilled in the art, without departing from the scope of the invention, as defined in the claims.

What I claim is:

1. In combination, a motorcycle comprising:
   a. a frame,
   b. a driving sprocket carried on said frame and rotatable about a first axis,
   c. a driven sprocket carried on said frame and rotatable about a second axis,
   d. a drive chain passing over said driving and said driven sprockets,
   e. a hub having one surface of predetermined contour,
   f. a guard for said sprockets and said chain,
      1. said guard comprising a front housing, a rear housing and a plurality of rigid pipe members interconnecting said housings to form an inflexible casing enclosing said sprockets and said chain,
      2. an adapter member having an adjacent surface conformably shaped in a symmetrical pattern of cusps and ridges mating with said predetermined contour, and
      3. means securing said driven sprocket to said adapter and said hub.

* * * * *